Sept. 21, 1943.  A. VENDITTY  2,330,095
JOINT CONSTRUCTION
Filed Nov. 15, 1941
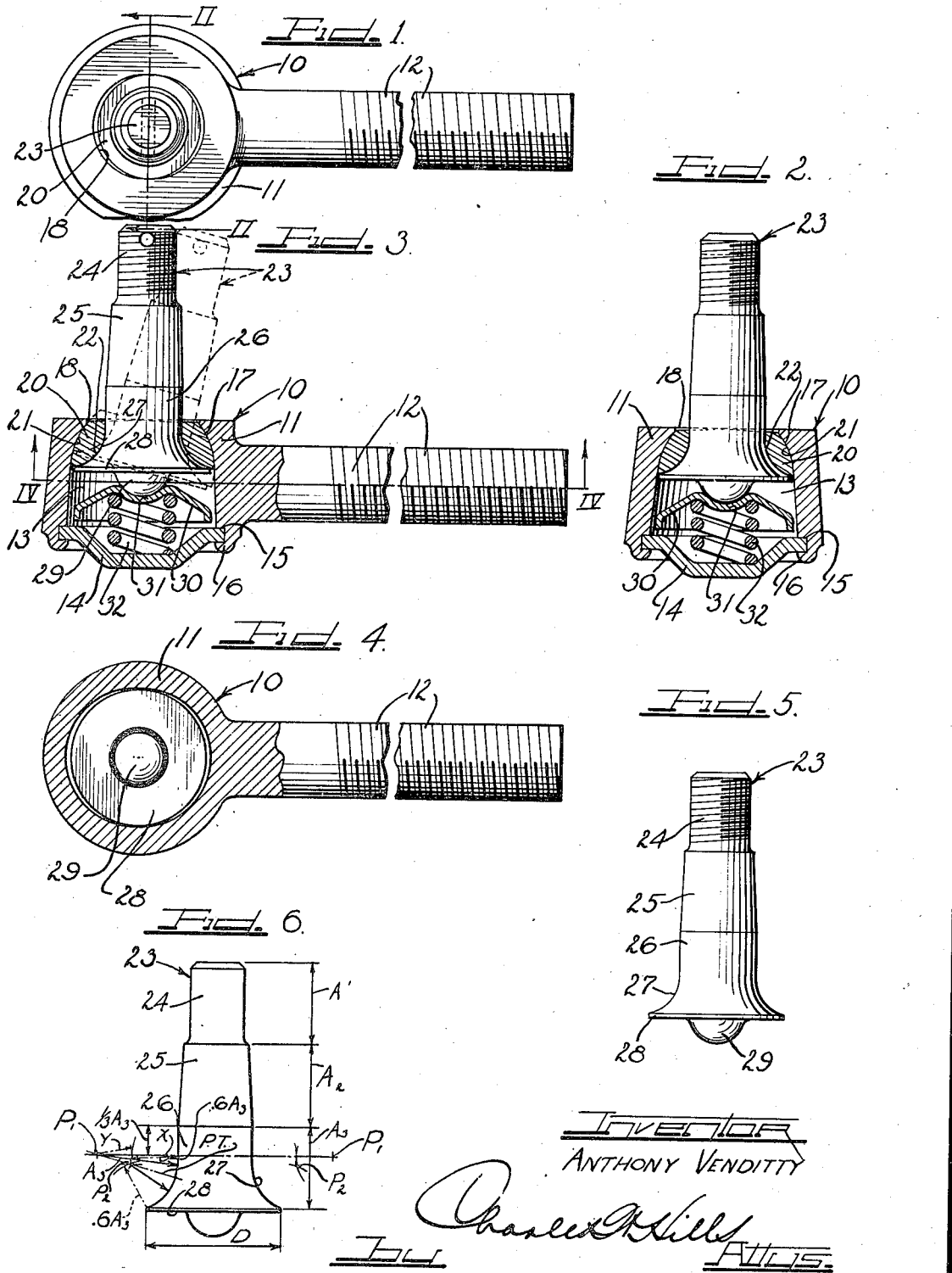
Inventor
ANTHONY VENDITTY
By Charles R. Mills
Attys.

Patented Sept. 21, 1943

2,330,095

UNITED STATES PATENT OFFICE 2,330,095

JOINT CONSTRUCTION

Anthony Venditty, Detroit, Mich., assignor to Thompson Products Incorporated, Cleveland, Ohio, a corporation of Ohio Application November 15, 1941, Serial No. 419,237

5 Claims. (Cl. 287—99)

This invention relates to joints accommodating relative rotation and relative tilting movements of the parts on separate sets of bearing surfaces.

More particularly the invention relates to tie rod type stud and socket joints having a seat member disposed between the stud and socket which tilts with the stud without being subjected to expanding forces and still being capable of accommodating wear take up to prevent looseness from developing in the joint structure even after long usage.

In accordance with this invention a housing member or socket is provided with an internal bearing wall accommodating tilting movements but so shaped as to prevent rotating movement of a seat member in bearing engagement therewith. The socket member and outer wall of the seat member preferably have cooperating toroidal oblate shaped bearing walls accommodating relative angulation of the members in all planes while resisting relative rotation of the members. A stud has the shank portion thereof extended through the seat member and is provided with an enlarged head for thrusting against the bottom of the seat member. A concave or bell-mouth-shaped bearing wall converges inwardly from the head of the stud to engage in bearing relation a complementary shaped inner bearing wall on the seat. The inner bearing wall and bearing portion of the stud are circular in cross section to accommodate relative rotating movements between the stud and seat.

The thrusting relationship between the head and the bottom of the seat transmits all tilting movements of the stud to the seat without, however, subjecting the seat to expanding forces tending to crack the same. As a result of this construction, the seat member can safely be made of relatively brittle material such as graphited Bakelite. Obviously, however, leaded bronze, or any suitable bearing metal can be used for the seat construction.

The bell-mouth-shape or concave-shape of the stud bearing portion permits the stud to enter further into the seat for compensating against wear developed in the parts. The joint constructions of this invention therefore have automatic wear take-up features and still, at the same time, eliminate expanding stresses in the seat member.

The cooperating toroidal oblate outer surfaces and the cooperating bell mouth-shaped inner surfaces all converge in the same general direction so that a single spring means acting on the stud will take up wear developed on either pair of bearing surfaces. The outer bearing surfaces accommodate the tilting movements and the inner bearing surfaces accommodate the rotating movements.

It is, then, an object of this invention to provide joints accommodating relative tilting and relative rotating movements of the parts on separate sets of bearing surfaces while eliminating expanding stresses in a member providing one wall for each pair of surfaces.

A further object of this invention is to provide joint constructions of the type wherein a stud is rotatably mounted in a seat member which, in turn, is tiltably mounted in a socket, and to arrange the shape of the stud so that it will extend under the seat to thrust thereagainst for carrying the seat therewith during all tilting movements of the stud while at the same time permit the stud to enter further into the seat as wear develops in the parts.

A further object of the invention is to eliminate the expanding stresses heretofore encountered in seat elements of tie rod type joints having separate pairs of bearing surfaces for accommodating the different types of relative movements of the parts.

Another further object of this invention is to provide a tie rod type stud and socket joint with a plastic seat member interposed between the stud and socket and to provide the stud with a large head thrusting against the bottom of the seat and an inwardly converging bell mouth shaped bearing surface in rotative bearing engagement with the seat.

A still further object of this invention is to improve stud and socket joints having interposed seat members so that the seat members will not be subjected to undue stresses.

Other and further objects of the invention will become apparent to those skilled in the art from the following description of the annexed sheet of drawings which, by way of preferred example, illustrate one embodiment of the invention.

On the drawing:

Figure 1 is a broken top plan view of a tie rod joint according to this invention.

Figure 2 is a vertical cross-sectional view, with parts in elevation, taken along the line II—II of Figure 1.

Figure 3 is a broken side elevational view, with parts in vertical cross section, of the joint structure shown in Figures 1 and 2 and illustrating, in dotted lines, a tilted position of the stud and seat member.

Figure 4 is a broken longitudinal cross-sectional view, with parts in elevation, taken along the line IV—IV of Fig. 3.

Figure 5 is a side elevational view of the stud used in the joint construction of Figures 1 to 4.

Figure 6 is a diagrammatic view of the stud illustrated in Figure 5 and illustrating a manner in which the bell mouth shaped curve of the stud head may be generated.

As shown on the drawing:

In Figures 1 to 4 inclusive the reference numeral 10 designates generally a tie rod joint or tie rod end. The joint 10 includes a housing 11 having a laterally extending threaded shank portion 12 for threaded insertion in the end of a tie rod (not shown).

The housing 11 defines an open ended socket chamber 13 adapted to be closed at one end by a closure cap 14 having the peripheral margin thereof seated against a shoulder 15 of the housing and engaged by a peened or spun portion 16 of the housing to fixedly retain the cap in position. The end of the chamber 13 opposite the cap end 14 has an inwardly converging toroidal oblate bearing wall 17 which converges to the other end of the housing to define an oblate restricted opening 18 to the chamber.

A bearing ring or seat 20 has a toroidal oblate outer bearing wall 21 cooperating with the housing bearing wall 17. The bearing ring or seat is thus adapted to tilt in the housing but, due to the oblate shape of the cooperating bearing surfaces, the seat cannot rotate about its own axis relative to the housing.

The external wall of the bearing ring may be considered as a section of a torus on one side of a plane through the torus parallel to the axis of rotation of the torus.

While toroidal oblate shapes are preferred for the cooperating outer wall of the bearing ring or seat and the inner wall of the housing, it should be understood that any cooperating surfaces shaped to accommodate relative tilting movements between the seat and housing while resisting relative rotating movements therebetween can be used. Alternatively, of course, any shape accommodating tilting movements can be used even though the shape has a circular cross section. If surfaces of revolution about a fixed point are used, a locking means may be desirable to prevent rotation of the seat. When oblate shapes are used, such locking means is unnecessary.

The bearing ring or seat 20 has a bell mouth shaped bore therethrough defined by an inner bearing wall 22 on the ring. This wall 22 converges inwardly from the bottom of the ring or seat along a convex path to the minimum diameter of the aperture and may then extend in a straight cylindrical path to the other end of the seat member.

A stud 23 having a threaded end 24, a tapered intermediate portion 25, a cylindrical portion 26 at the base of the tapered portion and an outwardly flaring bearing portion 27 at the lower end of the cylindrical portion merging into an enlarged annular collar or head 28, is mounted in the seating ring 20 with the collar 28 engaging the bottom of the seat ring and with the bearing portion 27 engaging the bearing surface 22 of the seat ring.

The stud 23 has a reduced diameter rounded button end 29 below the collar 28 at the axial center of the stud.

A cap member 30 is freely disposed in the socket chamber 13 and has a segmental spherical depressed portion 31 partially receiving the button end 29 of the stud. A coil spring 32 is interposed between the closure cap 14 and the cap 30 to urge the cap 30 toward the reduced opening 18 to the socket chamber. The cap 30, of course, urges the stud into proper bearing relation with the seating ring and the stud in turn urges the seating ring into proper bearing relation with the socket bearing wall.

In view of the fact that the collar 28 of the stud extends under the seat ring 20, tilting movements of the stud illustrated in dotted lines in Figure 3 are transmitted to the seat ring through the bottom thereof. Even when the bearing ring is under great friction load, tilting movements of the stud will not tend to expand the hole in the ring because these tilting movements are not transmitted in a wedge-like manner to the top and bottom of the hole.

In Figure 6 there is illustrated a manner of generating the outwardly flaring curve for the stud bearing portion 27. As therein shown the length of the stud is divided into three equal portions $A_1$, $A_2$ and $A_3$. In other words the threaded portion 24 comprises the top third $A_1$ of the stud; the tapered portion 25 comprises the middle third $A_2$ of the stud; and the cylindrical portion 26 and bearing portion 27 comprise the lower third $A_3$ of the stud. Of this lower third $A_3$ the cylindrical portion 26 constitutes about one-third or $\frac{1}{3}A_3$ as shown.

An arc with a radius having a length $A_3$ or the same as the length of the portions 26 and 27 is struck from a normal plane X at the base of the cylindrical portion 26. Since the diameter D of the collar 28 is predetermined to extend under the seat ring the arc formed from a radius of this length will not merge with the outer edge of the collar but a desired gentle curve outwardly from the cylindrical portion 26 is obtained and the center of this curve is the point $P_1$ as illustrated lying on the plane X.

A more abrupt curve is thus necessary to connect the gentle curve with the collar rim edge. This is obtained with a radius equivalent to about $.6A_3$ centered on point $P_2$. The point $P_2$ is located by arcs of radius $.6A_3$ centered on the base of the cylindrical portion 26 and also on the collar rim. An arc of unknown radius Y determined from the point $P_1$ to the point of intersection of the arc centered at the base of 26 on the plane X is swung to intersect with the arc centered on the collar rim 28. This point of intersection of the arcs locates $P_2$ and a line P. T. drawn through $P_1$ and $P_2$ will be perpendicular to the common tangent of both desired curves on the bearing surface. The lower or more abrupt portion of the curve is then generated on a $.6A_3$ radius from point $P_2$.

The resulting curve 27 thus flares outwardly from the cylindrical portion 26 in a smooth gentle slope which becomes more abrupt as it approaches the collar 28. The cooperating inner wall of the seat ring 20 has a complementary curvature.

The cooperating bell mouth hole and stud bearing surface accommodate wear take-up between the parts even though the collar 28 engages the bottom of the seat ring. As a result, the collar accomplishes the tilting action in a better manner and the bell mouth has the wear take-up feature capable of cooperating with the collar.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a socket with an opening giving entrance thereto, said socket having an internal bearing wall converging toward the opening and accommodating tilting movements, a seat in said housing having an external bearing wall converging toward said opening and tiltable on said internal bearing wall of the housing, said seat having an axial aperture therethrough defined by an internal bearing wall which flares outwardly from adjacent the converging end of the seat along a continuous convex path to the diverging end of the seat, a stud extending through said opening of the socket and through said aperture of the seat having a bearing wall in engagement with the seat flaring outward along a continuous concave path complementary to the bearing wall of the seat aperture to underlap the diverging end of the seat, said stud being rotatable about its own axis in said seat and said underlapping portion of the stud bearing wall transmitting tilting movement of the stud to the seat without subjecting the seat to expanding forces, and said convex and concave paths of the seat and stud bearing walls being complementary and effective to accommodate movement of the stud further into the seat to take up wear developed in the parts.

2. A joint construction comprising a socket having an internal bearing wall, a ring tiltable on said internal bearing wall of the socket, said ring having an axial opening therethrough defined along a major portion of its length by an internal bearing wall diverging outwardly along a continuous convex path to the bottom of the ring, a stud extending through said opening having a head portion with a bearing wall extending along a continuous concave path complementary to said convex path of the ring bearing wall and lapping over said bottom end of the ring, means in said socket urging the stud further into the ring and thereby urging the ring against the internal bearing wall of the socket, said lapping portion of the stud transmitting tilting forces to the ring without expanding the ring and said complementary convex and concave paths of the ring and stud bearing walls being effective to accommodate movement of the stud further into the ring for taking up looseness as wear develops in the parts to compensate for said wear.

3. A joint comprising a socket with an internal oblate bearing wall, a seat ring having an external oblate bearing wall tiltable but not rotatable on said internal wall of the socket, a stud extending through the seat ring having a headed portion underlapping the ring to transmit tilting forces from the stud to the ring without material radial stressing of the ring, and said stud and said ring having cooperating bell mouth shaped bearing surfaces of revolution accommodating rotation of the stud about its own axis and movement of the stud further into the ring as wear develops in the bearing surfaces.

4. A joint comprising a metal socket providing an interior bearing surface, a plastic ring having an outer wall tiltable on said surface, a metal stud extending through and rotatable in said plastic ring, a head portion on said stud underlapping the ring to thrust against the bottom thereof for transmitting tilting movements thereto, and said stud and said ring respectively having cooperating continuous concavo-convex bearing surfaces extending from adjacent the outer wall of the ring along the bottom of the ring and into the ring to a level near the top of the ring whereby as wear develops in said surfaces said stud can move further into the ring to compensate for the wear.

5. In a joint of the type having a ring tiltable in a socket and a stud rotatable in the ring, the improvements of a bearing portion on the stud sloping continuously outwardly along a gentle concave path from a cylindrical surface to a more abrupt concave curve and terminating in a rim and said ring having an inner complementary shaped wall receiving said bearing portion in rotatable relation.

ANTHONY VENDITTY.